(12) United States Patent
D'Amato et al.

(10) Patent No.: US 10,752,108 B2
(45) Date of Patent: Aug. 25, 2020

(54) TANK FILLER TUBE

(71) Applicant: Röchling Automotive SE & Co. KG, Mannheim (DE)

(72) Inventors: Matteo D'Amato, Levico Terme (IT); Andi Radu Ionut, Arges (RO)

(73) Assignee: Röchling Automotive SE & Co. KG, Mannheim (DE)

( * ) Notice: Subject to any disclaimer, the term of this patent is extended or adjusted under 35 U.S.C. 154(b) by 154 days.

(21) Appl. No.: 15/292,730

(22) Filed: Oct. 13, 2016

(65) Prior Publication Data
US 2017/0106742 A1    Apr. 20, 2017

(30) Foreign Application Priority Data
Oct. 15, 2015  (DE) .................... 10 2015 220 125

(51) Int. Cl.
*B60K 15/01*   (2006.01)
*B60K 15/04*   (2006.01)
*B60K 15/035*  (2006.01)

(52) U.S. Cl.
CPC ............ *B60K 15/04* (2013.01); *B60K 15/013* (2013.01); *B60K 15/035* (2013.01); *B60K 2015/03523* (2013.01); *B60K 2015/03538* (2013.01); *B60K 2015/03552* (2013.01); *B60K 2015/0458* (2013.01)

(58) Field of Classification Search
CPC .... B60K 15/013; B60K 15/035; B60K 15/04; B60K 15/077; B60K 2015/03394; B60K 2015/03538; B60K 2015/03512; B60K 2015/0458; B60K 2015/03523; F01N 2610/1466; F01N 2610/1406; F01N 2610/1413

USPC ................................................ 220/86.2, 746
See application file for complete search history.

(56) References Cited

U.S. PATENT DOCUMENTS 9,669,706 B2 *   6/2017  Koukan ............... B60K 15/035
9,849,775 B2 *  12/2017  Eberhardt .............. B60K 15/04
(Continued)

FOREIGN PATENT DOCUMENTS

DE   10 2013 100 076 A1   7/2014
DE   10 2013 016 683 A1   4/2015

OTHER PUBLICATIONS

Search Report Issued for German Patent Application No. 10 2015 220 125.2 dated Oct. 11, 2016, with machine English translation (14 pages).

Primary Examiner — Andrew D Perreault
(74) Attorney, Agent, or Firm — Prince Lobel Tye LLP

(57) ABSTRACT

A tank filler tube includes a fill tube line which features, in the tank assembled state, an inlet end further from the tank, which is designed for temporary insertion of the fill nozzle into a closer-to-the-tank insertion region of the fill tube line, and with a closer-to-the-tank transit line end in the tank assembled state, which is designed for transit of liquid in a direction of the liquid transit line leading away from the inlet end, wherein the fill tube line is of multi-part design.
At least one part of the ventilation line is for venting the gas displaced during a filling of a tank into the atmosphere. The fill tube line section featuring the transit line end extends into the insertion region further from the tank and is designed to accommodate at least one outlet end of a fill nozzle during a filling of a tank.

16 Claims, 1 Drawing Sheet

(56) References Cited

U.S. PATENT DOCUMENTS

2013/0306665 A1* 11/2013 Eberhardt .............. B60K 15/04
                                                        220/746
2014/0190981 A1    7/2014  Netzer et al.
2016/0263991 A1    9/2016  Koukan et al.

* cited by examiner

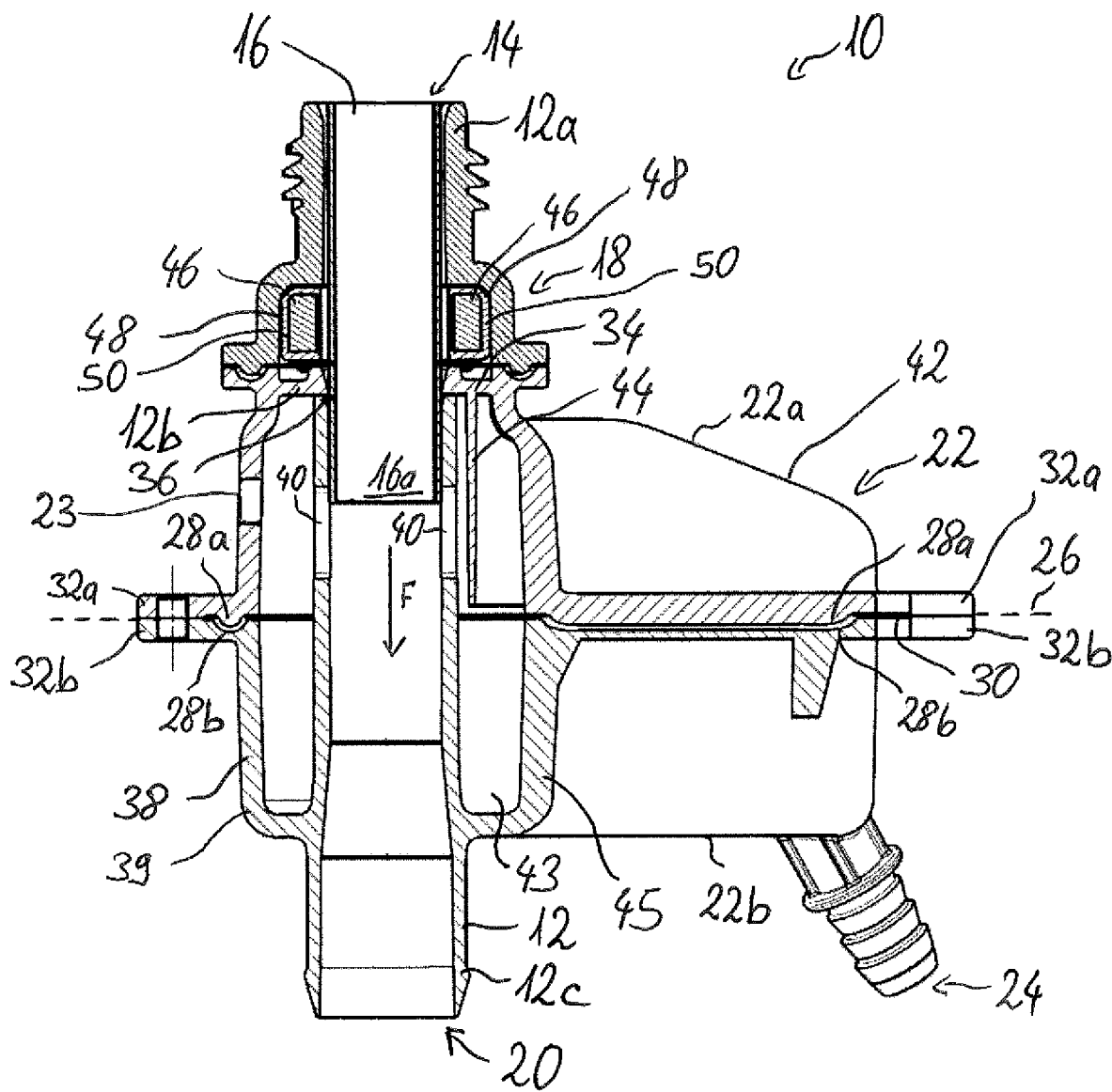

TANK FILLER TUBE

CROSS REFERENCE TO RELATED APPLICATION(S)

This application claims priority to German Application No. 10 2015 220 125.2, filed Oct. 15, 2015. The entirety of the disclosure of the above-referenced application is incorporated herein by reference.

BACKGROUND OF THE INVENTION

Field of the Invention

The present invention relates to a tank filler tube, in particular for a motor vehicle, comprising:

A fill tube line which features, in the tank assembled state, an inlet end further from the tank, which is designed for temporary insertion of the fill nozzle into a closer-to-the-tank insertion region of the fill tube line, and with a closer-to-the-tank transit line end in the tank assembled state, which is designed for transit of liquid in the direction of the liquid transit line leading away from the inlet end, wherein the fill tube line is of multi-part design and comprises a plurality of fill tube line sections configured separately from each other and sequentially following each other in the direction of the liquid transit line, and At least one part of the ventilation line for venting to the atmosphere the gas displaced during a filling of a tank.

Description of the Related Art

A tank filler tube of this kind is known from publication DE 10 2013 100 076 A1. In this known tank filler tube, the fill tube line section having the transit end features on its upstream end in the liquid transit direction, an end section which expands in a funnel shape opposite to the liquid transit direction, and a fill tube line section disposed upstream relative to the liquid transit direction opens therein. In the adjoining region of the two fill tube line sections disposed sequentially in the liquid transit direction, a sealing element is provided separately from the fill tube line in order to prevent any leakage of liquid from the fill tube line between the adjoining fill tube line sections. Due to the plurality of individual parts, both the manufacture as well as the assembly of this kind of tank filler tube is very complicated and thus associated with significant cost.

Under consideration of these disadvantages known from the prior art, one object of the present invention is to design a tank filler tube with a simple design.

This object is attained according to the present invention by a tank filler tube defined above, in which the fill tube line section featuring the transit line end extends into the insertion region further from the tank and is designed to accommodate at least one outlet end of a fill nozzle during a filling of a tank.

SUMMARY OF THE INVENTION

Thus according to the invention, a tank filler tube is provided in which the outlet end of a fill nozzle is insertable into the fill tube line section featuring the transit end. Consequently, during the filling process, liquid dispensed directly into this fill tube line section can be directed within the tank filler tube through a single fill tube line section. Undesirable leakage between two or more sequential fill tube line sections in the liquid transit direction consequently plays no notable role in the tank filler tube according to the invention. Therefore, no additional sealing means is required in the adjoining region of adjoining fill tube line sections, which ultimately leads to a simpler design in comparison to the prior art tank filler tube discussed above.

The fill tube line section featuring the transit line end is designed as a single piece. The term "single piece" as used here indicates that the fill tube line section featuring the transit line end features a single piece line element, on which both the transit line end as well as an accommodation section are formed to accommodate at least the outlet end of the fill nozzle. In a tank filler tube according to the invention, the fill tube line section featuring the transit line end is designed quite preferably as a single piece.

The ventilation line can comprise a closer-to-the-tank insertion end in the final assembled state, which is designed for the introduction of gas displaced during filling of the tank, into the ventilation line, and an escape end further from the tank in the final assembled state, through which the ventilation line releases the gas flowing therein to the atmosphere. The escape end can be configured separately from the insertion region of the fill tube line, in order to prevent the gas displaced from the tank from flowing up onto an operator. The escape end can be designed preferably such that the gas released from the ventilation line to the atmosphere emerges essentially orthogonally to the liquid transit direction. Preferably the escape end is equipped with an outlet valve.

Depending on the design of the at least one part of the ventilation line and the fill tube line, the assembly of a tank filler tube according to the invention can be especially simple, when the at least one part of the ventilation line is of a multiple-part design and comprises a plurality of ventilation line sections arranged sequentially to each other, preferably in the liquid transit direction. The at least one part of the ventilation line in one preferred embodiment, can comprise a ventilation line half dish upstream with respect to the liquid transit direction and a ventilation line half dish downstream relative to the liquid transit direction. An overall simple design with a small number of individual parts can then be obtained, in particular when the at least one part of the ventilation line features precisely two ventilation line half dishes.

The ventilation line sections can feature a joining region positioned essentially orthogonally to the liquid transit direction. In addition, it is preferable that two mutually adjoining ventilation line sections feature complementary engagement formations in their joining region, for example, the one ventilation line section has a groove and the other ventilation line section features a protrusion accommodated in the groove. A gasket made of a soft elastic material can be provided between the complementary engagement formations in order to ensure a liquid-tight connection between the adjoining ventilation line sections. The gasket is designed preferably to be continuous in the circumferential direction defined relative to the liquid transit direction. In addition, the ventilation line sections can display flange-like joining sections, at least in a circumferential section in their joining region, in order to allow joining of the ventilation line sections by means of separate connecting means, such as screws or clips.

In order to produce a tank filler tube according to the invention with a small number of individual parts, it is possible to create the design such that one fill tube line section and one ventilation line section are fitted together as a single piece. In one preferred embodiment, the fill tube line section featuring the transit line end can be designed as a single part with the upstream ventilation line half dish. Preferably the fill tube line section featuring the transit line end passes through the downstream ventilation line half dish such that an upstream section of the fill tube line section having the transit line end is enclosed by the downstream ventilation line half dish and/or that a downstream end of the fill tube line section having the transit line end in the liquid transit direction protrudes past the downstream ventilation line half dish, in order to connect this fill tube line section in a simple manner to a liquid line leading to a tank. The design can be such that the fill tube line section featuring the transit line end, with the exception of the downstream longitudinal end thereof, is enclosed essentially completely along the liquid transit direction, in particular including the upstream longitudinal end thereof, by the upstream and the downstream ventilation line half dish.

The downstream ventilation line half dish can feature a connection tube for connection of a gas line leading to the tank. The tank filler tube opens preferably and relative to the liquid transit direction into a region of the downstream ventilation line half dish located farthest downstream. This feature can ensure that any undesirable liquid carried in the gas will separate out in a region located farthest downstream and can be returned to the tank via the ventilation line.

In order to effectively prevent leakage of liquid from the fill tube line in the adjoining region of two fill tube line sections, in an additional refinement of the invention at least two directly sequential fill tube line sections in the liquid transit direction, preferably all directly sequential fill tube line sections in the liquid transit direction, rest against each other in their particular adjoining regions. Thus in the adjoining region of two mutually adjoining fill tube line sections, preferably in the adjoining region of all mutually adjoining fill tube line sections, a gasket such as one made of a soft elastic material can be supplied in order to provide a sufficient sealing effect.

In a further embodiment of the invention, the at least one part of the ventilation line, preferably the upstream ventilation line half-dish, comprises a wall section extending essentially orthogonally to the direction of the liquid transit line, which provides a fill tube line section across its wall thickness. In this embodiment, a wall section of the at least one part of the ventilation line extending essentially orthogonally to the liquid transit direction features a transit opening through which liquid to be introduced into a tank can flow. The particular region of the orthogonally extending wall section which directly bounds the transit opening defines, by means of its wall thickness, a fill tube line section. This embodiment thus features a compact design since one wall section of the at least one part of the ventilation line simultaneously also forms a fill tube line section.

In order to prevent unwanted leaks, the design can be modified such that the wall section of the at least one part of the fill tube line extending essentially orthogonally to the direction of the liquid transit line, and the fill tube line section featuring the transit line end, are positioned sequentially in the direction of the liquid transit line and are in contact with each other in their contact region.

A compact tank filler tube with an especially small number of individual parts can be created in that a fill tube line section featuring the insertion end is designed as a single piece with the wall section of the at least one part of the ventilation line extending essentially orthogonally to the direction of the liquid transit line.

Consequently, a tank filler tube according to the invention can be composed of just two individual parts: A first part which comprises, as a single piece, the downstream ventilation line half dish and the fill tube line section featuring the transit line end, and a second part which comprises, as a single piece, an upstream ventilation line half dish with a wall section extending essentially orthogonally to the liquid transit direction, and the fill tube line section featuring the insertion end. Thus a tank filler tube of this kind can be assembled in a particularly simple and low-cost manner.

If the fill tube line section featuring the insertion end and the upstream ventilation line half dish are not designed together as a single piece, then the number of individual parts compared to the above configuration is increased to just three, which still allows simple and low-cost manufacture.

In order to produce a compact tank filler tube which takes up very little installation space, the invention provides that the at least one part of the ventilation line, preferably the fill tube line section featuring the transit line end, features a ventilation chamber (38) enclosed radially by a fill tube line. If the at least one part of the ventilation line comprises an upstream and a downstream ventilation line half dish, then the ventilation chamber can be bounded radially outward by these ventilation line half dishes relative to the liquid transit direction, and bounded radially inward by the fill tube line and/or by the fill tube line section featuring the transit line end. Ventilation line half dishes preferably form boundary walls of the ventilation chamber.

A ventilation connector can be provided between the fill tube line and/or the fill tube line section featuring the transit line end. The ventilation connector can comprise one or a plurality of openings passing through the fill tube line wall, which openings establish a connection between the fill tube line and the ventilation chamber. Preferably the ventilation connection is located in the fill tube line section featuring the transit line end. By means of the ventilation connection, gas which collects within the fill tube line between two filling cycles can be discharged via the ventilation line, without any separate ventilation line having to be provided for this. Therefore, due to this feature, ultimately a simple overall configuration can be obtained. The escape end of the ventilation line is provided preferably in a circumference wall of the ventilation chamber. Thus gas exiting the ventilation line can be released to the atmosphere essentially orthogonally to the liquid transit direction, so that then finally it can be thereby assured that the operator is not exposed to gas displaced from the tank.

In another preferred embodiment, the invention provides that the ventilation chamber comprises, in a circumferential section, an elongation section extending orthogonally away from the fill tube line relative to the direction of the liquid transit line. This elongation section can constitute, for example, a buffer volume, which can be dimensioned such that gas displaced from a tank during a filling process can be accommodated therein. The gas collected therein from this elongation section can be released to the atmosphere after a certain time delay and/or at a rate of flow which is less than the inflow rate of gas from the tank into the elongation section. Thus it can be assured that gas displaced from the tank during a filling process cannot move immediately to the outside atmosphere and flow onto an operator, but rather only after an extended period of time in comparison to the time needed for the filling process. This feature can effectively prevent an operator from being exposed to the displaced gas, since an operator in general is only located in the vicinity of the tank filler tube for the duration of the filling process, that is, only for a short period of time in comparison to the overall period of time during which the gas collected in the elongation section is released to the atmosphere. An elongation section with a large volume can be produced, given the appropriate dimensions of the fill tube line, such that its extension in the circumferential direction and/or in the liquid transit direction will increase with increasing radial distance from the fill tube line.

A liquid-permeable separating wall can be provided in the ventilation chamber between a near region of the fill tube line and the elongation section. Thus a liquid permeability can be obtained in an otherwise liquid impermeable separating wall due to the choice of material of the separator wall or due to one or a plurality of transit openings. This kind of separating wall is especially expedient when gas displaced from the tank is introduced via the elongation section into the ventilation chamber, since the separating wall can effect a certain amount of flow throttling. If gas displaced via the elongation section is introduced into the ventilation chamber, it is especially preferred that the separating wall is permeable for the liquid being filled, since then liquid exiting in particular from the fill tube line into the ventilation chamber, for example via a ventilation connection, can be carried into the tank via the elongation section, that is, via the ventilation line.

In order to reinforce the interior volume of the ventilation chamber and to separate out any liquid which undesirably is being carried by the gas flowing in the ventilation line, the ventilation chamber can feature an interior structure, such as struts or baffle plates. The separating wall mentioned above can also serve as this kind of baffle plate or strut. In particular, in order to effectively separate any liquid emerging through the ventilation connection between the fill tube line and ventilation chamber into the ventilation chamber, a baffle plate can be disposed inside the ventilation chamber, which is positioned at a distance from the fill tube line in an orthogonal direction to the direction of the liquid transit line and spans at least partially, preferably completely, a ventilation connection in the direction of the liquid transit line. In order to reduce the consumption of material and thus to save weight, it is preferred that at least one baffle plate, preferably all baffle plates and thus also the baffle plate spanning the ventilation connection, has/have a thickness which amounts to at most 60%, preferably at most 40%, and quite preferably at most 25% of the thickness of the wall of the fill tube line.

In order to effectively prevent the undesirable release of liquid through the fill nozzle, such as when the outlet end of the fill nozzle is not located in the insertion region of the fill tube line, the fill nozzle can be equipped with a valve at its outlet region, which can be switched open only when it is in the liquid transit position when the outlet region of the fill nozzle is introduced into a tank filler tube. A valve of this kind can be magnetically actuated, for example. Its design can be such that a magnet device is disposed at the insertion region of the fill tube line which surrounds the fill tube line at least partially, and preferably entirely. Thus a magnetic interaction with the valve disposed in the outlet region of the fill nozzle will occur only when the outlet region of the fill nozzle is inserted in the insertion region of the fill tube line, so that any undesirable dispensing of liquid through the fill nozzle can be effectively prevented.

The magnet device is preferably a permanent magnet. The magnet device can comprise, for example, a plurality of preferably identical circular magnet segments which are arranged in the circumferential direction, preferably equidistant, in sequence so as to surround the fill tube line. Alternatively or additionally, the magnet device can comprise a ring magnet which entirely surrounds the fill tube line.

In order to be able to position the magnet device in a defined position at the insertion region of the fill tube line, the invention provides that the magnet device is accommodated at least partly, preferably entirely, in a magnet device holder of a fill tube line section featuring the insertion end. If the magnet device comprises a plurality of circular magnet segments, then the magnet device holder can feature a plurality of recesses with an interior structure complementary to the exterior structure of the particular circular magnet segments. The particular recesses need not be open in the liquid transit direction, since the particular magnets can be installed in recesses corresponding to a direction orthogonal to the liquid transit direction. A design of this kind also makes it possible to configure the fill tube line section with an upstream ventilation line section, together with the insertion end as a single piece.

However, if the magnet device comprises a ring-shaped magnet, then it is preferable that the magnet device holder features a recess open at least in the liquid transit direction to accommodate the ring-shaped magnet. In order to secure the corresponding magnet in the liquid transit direction in the simplest possible manner, it is preferable that the magnet device holder be bounded by a wall section of the at least one part of the ventilation line which extends essentially orthogonally to the liquid transit direction. Thus the wall section of the at least one part of the ventilation line extending essentially orthogonally to the liquid transit direction can also be used to secure the magnet device in the liquid transit direction, which ultimately contributes to a compact overall design.

In order to prevent a direct contact between the liquid being filled and the magnet device, the invention provides that the magnet device features a sheathing at least in sections, and preferably a complete sheathing. This sheathing is preferably chemically resistant to the liquid being filled.

A tank filler tube according to the invention is produced preferably of plastic and quite preferably is produced by injection molding. If the individual parts of the tank filler tube feature gaskets of soft elastic material at their joint regions, then the gasket can be produced as a single unit together with one of the pieces being joined, preferably by two-component injection molding. The significant advantage of two-component injection molding is that different plastics can be processed in one work step in a single injection molding tool. Thus simple manufacture of the invented tank filler tube can be achieved, and together with this, reduced manufacturing costs.

It should also be mentioned that the tank filler tube described above can also be used for permanent assembly to a motor vehicle. In this connection, "permanent" means that a tank filler tube can be mounted to a motor vehicle, especially during driving. The tank filler tube can be mounted to a motor vehicle such that a tank connected to the tank filler tube can be filled by the force of gravity. In particular, liquid can be poured into the fill tube line, wherein the inlet end of the fill tube line is visible preferably from the outside. The present invention relates in another embodiment to a motor vehicle with a tank filler tube as is described above.

The present invention will be explained in greater detail below, by reference to the attached FIGURE, which provides a schematic, cross-sectional view through a tank filler tube according to the invention.

BRIEF DESCRIPTION OF THE DRAWING FIGURES

The FIGURE depicts, quite in general, a tank filler tube designated by reference number 10, shown in a schematic side view. The tank filler tube 10 comprises a fill tube line 12 with an insertion end 14 positioned further from the tank when in the final assembled state; this insertion end is designed for temporary insertion of an insertion nozzle 16 into an insertion region 18 of the fill tube line 12 located further from the tank, and is designed with a closer-to-the-tank transit line end 20 when in the final assembled state; this transit line end 20 is designed for the passage of liquid in a liquid transit direction F leading away from the insertion end 14. The fill tube line 12 has a multiple part design. In the embodiment depicted in the FIGURE, the fill tube line 12 features a first fill tube line section 12a featuring the insertion end 14, a second fill tube line section 12b adjoining thereon in the liquid transit direction F, and a third fill tube line section 12c featuring the transit line end 20 following thereon in the liquid transit direction F. In a modified embodiment, the first and the second fill tube line sections 12a, 12b can be designed as a single part, so that an overall more compact design is obtained due to the smaller number of individual parts. The fill tube line section 12c featuring the transit line end 20 extends up into the insertion region 18 further from the tank and is designed to accommodate at least one outlet end 16a of the fill nozzle 16 during the fueling process.

DETAILED DESCRIPTION OF THE PREFERRED EMBODIMENTS

In order to effectively prevent the leakage of liquid from the fill tube line 12 in the adjoining region of two fill tube line sections 12a, 12b, 12c, the invention provides that at least two fill tube line sections following each other sequentially in the liquid transit direction F are in contact with each other in their mutual adjoining regions. Of course, in the adjoining region of two mutually adjoining fill tube line sections 12a, 12b, 12c, a gasket, such as one made of a soft elastic material can be provided, preferably in the adjoining region of all mutually adjoining fill tube line sections.

Thus in the tank filler tube 10 depicted in the FIGURE, the outlet end 16a of the fill nozzle 16 is introduced during a fueling process into the particular fill tube line section 12c, which features the transit line end 20. Consequently, liquid within the tank filler tube 10 can be directed through a single fill tube line section. Any undesirable leakage between two or more sequential fill tube line sections in the liquid transit direction F consequently plays no role in this tank filler tube 10.

Moreover, the tank filler tube 10 comprises a part of a ventilation line 22 with a closer-to-the-tank inlet end in the final, assembled state (not depicted here), which is designed for the introduction of gas into the ventilation line 22, this gas being displaced during filling of the tank, and with an escape end 23 located further from the tank in the final, assembled state, through which the ventilation line 22 releases the gas flowing therein to the atmosphere. The inlet end can be connected, for example, by means of a flexible hose line, to a connection tube 24 as depicted in the FIGURE.

The part of the ventilation line 22 shown in the FIGURE can also be of a multiple part design and feature a plurality of sequential ventilation line sections 22a, 22b in the liquid transit direction. As depicted in the FIGURE, one ventilation line section 22a can be designed as an upstream ventilation line half dish 22a in the final assembled state of the tank filler tube 10, and one ventilation line section 22b can be designed as a downstream ventilation line half dish 22b in the final, assembled state of the tank fill tube 10. The ventilation line half dishes 22a, 22b can feature, as depicted in the FIGURE, a joining region 26 extending essentially orthogonally to the liquid transit direction F. Here it is preferred that the ventilation line half dishes 22a, 22b feature in their joining region complementary engagement formations, such as a protrusion 28a in the upstream ventilation line half dish 22a, and a groove 28b in the downstream ventilation line half dish 22b, wherein the protrusion 28a can be accommodated in the groove 28b. Between the complementary engagement formations 28a, 28b, a gasket 30 can be supplied, such as one made of a soft, elastic material. The complementary engagement formations 28a, 28b and/or the gasket 30 are designed to be continuous in a circumferential direction defined relative to the liquid transit direction F. In addition, the ventilation line half dishes 22a, 22b can feature flange-like joining sections 32a, 32b, at least in one circumferential section of their joining region 26, in order to enable a connection of the ventilation line half dishes 22a, 22b by special connecting means, such as screws or clips.

As depicted in the FIGURE, the fill tube line section 12 featuring the transit line end 20 can be designed as a single piece with the downstream ventilation line half dish 22b. Thus an overall more compact design can be obtained with a small number of individual parts. Preferably the fill tube line section 12c featuring the transit line end 20 passes through the downstream ventilation line half dish 22b and protrudes past the downstream ventilation line half dish 22b in the liquid transit direction F, in order to allow simple connection of a connecting line (not depicted in the FIGURE) to the tank at the fill tube line section 12c featuring the transit line end 20. With the exception of its downstream end, the fill tube line section 12c featuring the transit line end 20 is enclosed by the upstream and by the downstream ventilation line half dish. Preferably the connection tube 24 opens into the farthest downstream region of the downstream ventilation line half dish 22b in the liquid transit direction F, in order to separate at this part of the ventilation line 22 any liquid carried along through the ventilation line 22. Thus it can be possible to return this separated liquid via the ventilation line 22 back into the tank.

The second fill tube line section 12b can be formed by a wall section 34 of the upstream ventilation line half dish 22a extending essentially orthogonally to the liquid transit direction F. Herein the wall section 34 of the upstream ventilation line half dish 22a extending essentially orthogonally to the liquid transit direction F features a transit opening 36, through which liquid to be introduced into a tank can flow. That particular region of the orthogonal extending wall section 34, which directly bounds the transit opening 36, thus defines via its wall thickness the second fill tube line section 12b. The fill tube line section 12c featuring the transit line end 20 can be in contact with the wall section 34 extending essentially orthogonally to the liquid transit direction.

As was mentioned at the beginning of the description of the FIGURE, the first and the second fill tube line sections 12a and 12b can be designed as a single part. Thus a tank filler tube formed from two individual parts can be obtained: A first part which as a single piece comprises the downstream ventilation line half dish 22b and the fill tube line section 12c featuring the transit line end 20, and a second part which comprises as a single piece the upstream ventilation line half dish 22a and the fill tube line section 12a featuring the insertion end 14. In the tank filler tube 10 depicted in the FIGURE, the fill tube line section 12a featuring the insertion end 14, and the upstream ventilation line half dish 22a are not designed as a single part, so that this tank filler tube is composed of three individual parts: The fill tube line section 12a featuring the insertion end 14, the upstream ventilation line half dish 22a, and the downstream ventilation line half dish 22b which is designed as a single piece with the fill tube line section 12c featuring the transit line end 20.

In order to obtain a compact tank fill tube which requires little installation space, the at least one part of the ventilation line 22 can feature a ventilation chamber 38 that surrounds the fill tube line 12 radially on the outside and is penetrated by it. Thus a ventilation connection 40 can be disposed between the fill tube line 12 and/or the fill tube line section 12c featuring the transit line end 20 and the ventilation chamber 38. The ventilation connection 40 can comprise one or a plurality of fill tube line wall openings in a fill tube line section, such as the fill tube line section 12c featuring the transit line end 20. The latter fill tube line section provides a connection between the fill tube line 12 and the ventilation chamber 38. Any gas collected within the fill tube line 12 between two filling cycles can be released via the ventilation connection 40 via the ventilation line 22, without any separate ventilation line being required. Thus this means can also ultimately contribute to a simple overall design.

The ventilation chamber 38 can extend in the liquid transit direction F across the entire extent of the at least one part of the ventilation line 22. The outlet end 23 of the ventilation line 22 is disposed preferably in a circumferential direction wall 39 of the ventilation chamber 38. Thus any gas exiting from the ventilation line 22 can be released to the atmosphere essentially orthogonally to the liquid transit direction F, so that finally this measure can ensure that any gas displaced from the tank will not come in contact with an operator.

A circumferential section of the ventilation chamber 38 can comprise an elongation section 42 extending orthogonally away from the fill tube line 12 in the liquid transit direction F. This elongation section 42 can include, for example, a buffer volume, which is dimensioned such that any gas displaced from the tank during a filling processing can be accommodated there. The gas collected in this elongation section 42 can be released to the atmosphere only after a defined time delay and/or at a low rate of flow. This measure can ensure that gas displaced from the tank during a filling process will not move immediately to the outside and come in contact with an operator, but rather over an extended period of time in comparison to the amount of time used for the filling process. This can effectively prevent an operator from being exposed to the displaced gas, since an operator in general is in the vicinity of the tank fill tube only during the period of time needed for the filling process; that is, only during a short period of time in comparison to the total time during which the gas collected in the elongation section 42 is released to the atmosphere. An elongation section 42 with a large volume can be created—under the existing dimensions of the fill tube line 12—in that its extension in the circumferential direction and/or in the liquid transit direction F increases with increasing radial distance from the fill tube line 12.

A liquid-permeable separating wall 45 can be disposed between a region 43 of the ventilation chamber 38 near the fill tube line 12 and the elongation section 42. This separating wall 45 is particularly expedient in the embodiment shown in the FIGURE, since it can provide a certain amount of flow throttling for the gas introduced via the connection tube 24. It is preferred here, that the separating wall 45 be permeable for the filled liquid, since then any liquid emerging in particular from the fill tube line 12 into the ventilation chamber 38 can be drained into the tank via the ventilation line 22.

In order to reinforce the interior volume of the ventilation chamber 38 and to separate out any liquid which is carried by the gas flowing in the ventilation line 22, the ventilation chamber 38 can feature an interior structure 44 with struts or baffle plates, for example. In particular, in order effectively to remove any liquid exiting through the ventilation connection 40 between fill tube line 12 and ventilation chamber 38 into the ventilation chamber 38, a baffle plate 44 can be disposed inside the ventilation chamber 38, which is placed at a distance to the fill tube line 12 in an orthogonal direction to the liquid transit direction F and which spans a ventilation connection 40 in the liquid transit direction F. Since the separation of liquid is not dependent on the thickness of the baffle plate 44, it is preferred that it have a lesser thickness than a wall of the fill tube line 12, preferably less than 60%, more preferably less than 40%, and most preferably less than 25% of the thickness of the fill tube line 12.

In order to prevent the undesirable release of liquid through the fill nozzle 16, such as when the outlet end 16a of the fill nozzle 16 is not introduced into the fill tube line 12, the fill nozzle 16 can be equipped with a valve in its outlet region, which will only be operated to a permeable position when the outlet region 16a of the fill nozzle 16 is introduced into a tank filler tube. A valve of this kind can be magnetically operated, for example. In the tank filler tube 10 depicted in the FIGURE, a magnet arrangement 46 is provided for this purpose in the insertion region 18 and it can surround the fill tube line 12 in sections or even completely. Thus a magnetic interaction with the valve located in the outlet region of the fill nozzle 16 takes place only when the outlet region in the insertion region 18 of the fill tube line 12 is inserted so that any undesirable release of liquid through the fill nozzle 16 can be effectively prevented.

The magnet device 46 is preferably a permanent magnet. The magnet device 46 can comprise, for example, a plurality of preferably identical circular magnet segments, which are disposed sequentially, preferably equidistant, in the circumferential direction and surrounding the fill tube line 12. Alternatively the magnet device 46 can comprise a ring magnet which entirely surrounds the fill tube line 12.

In the present embodiment the magnet device 46 is accommodated in a magnet device holder 48 of the first fill tube line section 12a, which is designed here as an open recess in the downstream direction. The magnet device holder 48 is bounded on one side by the wall section 34 of the at least one part of the ventilation line 22 extending essentially orthogonally to the liquid transit direction F. In this case therefore, the wall section 34 of the at least one part of the ventilation line 22 extending essentially orthogonally to the liquid transit direction F can also be used to secure the magnet device 46 in the liquid transit direction F, which ultimately contributes to a compact overall design, since no additional attachment means are needed for this.

In order to prevent direct contact between the liquid being filled, and the magnet device 46, the invention provides that the magnet device 46 features an at least partial, preferably complete, sheathing 50. This sheathing 50 is preferably chemically resistant to the liquid being filled.

The tank filler tube 10 is preferably made of plastic and especially preferred in an injection molding method. If the individual parts of the tank filler tube 10, such as the fill tube line sections 12a, 12b, 12c, or the ventilation line half dishes 22a, 22b, have any gaskets made of soft elastic materials in their joining regions, then the gasket can be produced as a single piece with the adjoining single parts, preferably by a two-component injection molding method. The significant advantage of two-component injection molding is that different plastics can be processed in one work step in a single injection molding tool. Thus simple manufacture of the tank filler tube 10 can be obtained and associated with this, a lower manufacturing cost.

It should also be mentioned that the tank filler tube 10 depicted in the FIGURE can be designed for permanent assembly to a motor vehicle.

The invention claimed is:

1. A tank filler tube for a tank of a motor vehicle, comprising:
   a fill tube line having an inlet end and a transit end, the inlet end being further from the tank than the transit end, said fill tube line being capable of receiving a fill nozzle into an insertion region of the fill tube line at the inlet end, said transit end being for transit of liquid in a liquid transit direction leading away from the inlet end; and
   at least one part of a ventilation line for venting gas displaced during a tank filling into the atmosphere;
   wherein the fill tube line is of multi-part design and comprises a plurality of fill tube line sections configured separately from each other and sequentially following each other in the liquid transit direction;
   wherein the plurality of fill tube line sections comprises a single-piece fill tube line section including the transit end, which is designed as a single piece, extends into the insertion region, and is designed to accommodate at least one outlet end of the fill nozzle during a filling of the tank;
   wherein the tank filler tube entirely extends between the inlet end and the transit end;
   wherein the at least one part of the ventilation line has a multi-part design and comprises a plurality of ventilation line segments;
   wherein the plurality of ventilation line segments are arranged such that the at least one part of the ventilation line comprises a ventilation line half-dish upstream relative to the liquid transit direction and a ventilation line half-dish downstream relative to the liquid transit direction;
   wherein the upstream ventilation line half-dish comprises a wall section extending essentially orthogonally to the liquid transit direction, which provides one of the plurality of fill tube line sections across its wall thickness;
   wherein the single-piece fill tube line section including the transit end is a single piece with the downstream ventilation line half-dish;
   wherein the single-piece fill tube line section including the transit end passes through the downstream ventilation line half dish;
   wherein the wall section of the upstream ventilation line half-dish extending essentially orthogonally to the liquid transit direction, and the single-piece fill tube line section including the transit end, comprise a first border region, are positioned sequentially in the liquid transit direction and are in abutment with each other in the first border region;
   wherein the at least one part of the ventilation line includes a ventilation chamber enclosing radially the fill tube line;
   wherein the ventilation chamber is penetrated by the fill tube line;
   wherein the ventilation chamber is bounded radially outwardly by the upstream ventilation line half-dish and by the downstream ventilation line half-dish; and
   wherein the ventilation chamber is bounded radially inwardly by the single-piece fill tube line section.

2. The tank filler tube according to claim 1,
   wherein at least two fill tube line sections of the plurality of fill tube line sections directly sequential in the liquid transit direction comprise additional border regions, and abut each other in the respective additional border regions.

3. The tank filler tube according to claim 1,
   wherein the at least one part of the ventilation line comprises a wall section extending essentially orthogonally to the liquid transit direction, which provides a fill tube line section of the plurality of fill tube line sections across its wall thickness.

4. The tank filler tube according to claim 3,
   wherein a fill tube line section of the plurality of fill tube line sections including the insertion end is designed as a single piece with the wall section of the at least one part of the ventilation line extending essentially orthogonally to the liquid transit direction.

5. The tank filler tube according to claim 1,
   wherein the ventilation chamber comprises, in a circumferential section, an elongation section extending orthogonally away from the fill tube line relative to the liquid transit direction, wherein the elongation section is separated from a region of the ventilation chamber nearer to the fill tube line by a liquid-permeable separation wall.

6. The tank filler tube according to claim 1,
   wherein the ventilation chamber includes an interior structure positioned at a distance from the fill tube line in an orthogonal direction to the liquid transit direction and spans at least partially, a ventilation connection in the liquid transit direction.

7. The tank filler tube according to claim 1,
   wherein a magnet device is disposed at the insertion region of the fill tube line and which surrounds the fill tube line at least partially.

8. The tank filler tube according to claim 7,
   wherein the magnet device is accommodated at least partly, in a magnet device holder of a fill tube line section of the plurality of fill tube line sections including the insertion end.

9. The tank filler tube according to claim 8
   wherein the magnet device holder is bounded by the wall section of the at least one part of the ventilation line extending essentially orthogonally to the liquid transit direction.

10. A motor vehicle, comprising the tank filler tube according to claim 1.

11. The tank filler tube according to claim 1, wherein the plurality of ventilation line segments are arranged sequentially in the liquid transit direction.

12. The tank filler tube according to claim 1, wherein all fill tube line sections of the plurality of fill tube line sections directly sequential in the liquid transit direction comprise respective additional border regions and abut each other in the respective additional border regions.

13. The tank filler tube according to claim 1, wherein between the fill tube line and ventilation chamber there is a ventilation connection.

14. The tank filler tube according to claim 1, wherein the ventilation chamber includes a baffle plate positioned at a distance from the fill tube line in an orthogonal direction to the liquid transit direction and completely spanning a ventilation connection in the liquid transit direction.

15. The tank filler tube according to claim 7, wherein the insertion region surrounds the fill tube line entirely.

16. The tank filler tube according to claim 7, wherein the magnet device is accommodated entirely in a magnet device holder of a fill tube line section featuring the insertion end.

* * * * *